United States Patent
Iida et al.

(10) Patent No.: US 12,061,131 B2
(45) Date of Patent: Aug. 13, 2024

(54) JUDGMENT DEVICE AND JUDGMENT METHOD

(71) Applicant: NIPPON TELEGRAPH AND TELEPHONE CORPORATION, Tokyo (JP)

(72) Inventors: Hiroyuki Iida, Musashino (JP); Sachi Tsujimura, Musashino (JP); Hidenobu Hirota, Musashino (JP); Takui Uematsu, Musashino (JP); Naotsugu Ambe, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 447 days.

(21) Appl. No.: 17/595,930

(22) PCT Filed: Jun. 3, 2019

(86) PCT No.: PCT/JP2019/022050
§ 371 (c)(1),
(2) Date: Nov. 29, 2021

(87) PCT Pub. No.: WO2020/245893
PCT Pub. Date: Dec. 10, 2020

(65) Prior Publication Data
US 2022/0228947 A1    Jul. 21, 2022

(51) Int. Cl.
*G01M 11/00* (2006.01)
*G01M 11/02* (2006.01)

(52) U.S. Cl.
CPC .... *G01M 11/0207* (2013.01); *G01M 11/0228* (2013.01)

(58) Field of Classification Search
CPC .. G01M 11/00; G01M 11/33; G01M 11/0207; G01M 11/0228; G01M 11/088; G01M 11/35; H04B 10/071; G01N 21/958
See application file for complete search history.

(56) References Cited

U.S. PATENT DOCUMENTS

| | | | |
|---|---|---|---|
| 8,594,496 B2 * | 11/2013 | Effenberger | ....... G01M 11/3136 398/31 |
| 2013/0148109 A1 * | 6/2013 | Bei | ....... H04B 10/071 356/73.1 |
| 2014/0072296 A1 * | 3/2014 | Montalvo Garcia | ....... H04B 10/0775 398/16 |

FOREIGN PATENT DOCUMENTS

| | | |
|---|---|---|
| JP | 2008309958 A | 12/2008 |
| JP | 200925052 A | 2/2009 |

(Continued)

OTHER PUBLICATIONS

Keita Matsuoka et al. "New Optical Fiber Identifier", Proceedings of the 64th IWCS Conference. Oct. 5, 2015. pp 704-708.

*Primary Examiner* — Abdullahi Nur
(74) *Attorney, Agent, or Firm* — Harness, Dickey & Pierce, P.L.C.

(57) ABSTRACT

An object is to provide a determination device that determines a state of a terminal end portion of a coated optical fiber at any location of the coated optical fiber. Reflection of test light varies in a reflection amount at each wavelength depending on a situation of the terminal end portion of the coated optical fiber. In other words, if the magnitude of the reflection amount at each wavelength can be known, the situation of the terminal end portion of the coated optical fiber can be estimated. The determination device according to the present invention is configured to make test light having a plurality of wavelengths incident from the optical (Continued)

fiber side and determine the test light based on a light intensity ratio of each reflected light beams reflected at the terminal end. In addition, reflection of test light varies in return loss at each wavelength depending on a situation of the terminal end portion of the coated optical fiber. If Rayleigh backscattered light can also be measured when measuring a reflection amount, the return loss can be known for each wavelength, and the situation of the terminal end portion of the coated optical fiber can be estimated from the result. The determination device according to the present invention is configured to make test light having a plurality of wavelengths incident from the optical fiber side and determine the test light based on a return loss at the terminal end.

7 Claims, 7 Drawing Sheets

(56) References Cited

FOREIGN PATENT DOCUMENTS

| JP | 2013113890 A | 6/2013 |
| JP | 2016151522 A | 8/2016 |
| JP | 2018186503 A | 11/2018 |

* cited by examiner

JUDGMENT DEVICE AND JUDGMENT METHOD

CROSS-REFERENCE TO RELATED APPLICATIONS

This application is a 371 U.S. National Phase of International Application No. PCT/JP2019/022050 filed on Jun. 3, 2019. The entire disclosures of the above applications are incorporated herein by reference.

TECHNICAL FIELD

The present disclosure relates to a determination device and a determination method by which, on an optical path in the form of a passive optical network (PON), test light is made incident from a side of a coated optical fiber at any position on the coated optical fiber connected to a branch side of a branch splitter to determine a state of a terminal end of the coated optical fiber on a user's home side.

BACKGROUND ART

A fiber-to-the-home (FTTH) service by which an access network between a communication building and a user's home is connected with optical fibers is provided mainly through a network in the form of a PON that splits the optical fibers by providing a branch splitter (hereinafter referred to as an external branch SP) outside the communication building. In construction for opening a PON-type optical line, determining at a work site whether a coated optical fiber of the external branch SP on the user's home side is an active coated optical fiber or an inactive coated optical fiber is an important matter to be determined in the step of identifying the coated optical fiber to be constructed. Here, the "active coated optical fiber" refers to a coated optical fiber that has already been used by a particular user, and the "inactive coated optical fiber" refers to a coated optical fiber that is not being used by a user.

In order to quickly and efficiently make an optical line available to respond to an optical line use application filed by a user, a coated optical fiber connected to the branch side of an external branch SP is extended in advance in units of cables to a utility pole near the home area. Further, the part from the branch side of the external branch SP to the terminal end of the coated optical fiber may be described as a "downstream portion of the external branch SP". The opening construction for an optical line is a step of cutting a coated optical fiber housed in a cable at a utility pole located near a user's home for which an application has been submitted, drawing out the coated optical fiber from the utility pole to the user's home, and connecting the coated optical fiber to an optical subscriber terminal end device (referred to as an optical network unit or hereinafter ONU) installed inside the user's home. Further, such a utility pole from which a coated optical fiber is drawn out to a user's home as described above will be referred to as a drawing-out pole. Here, the cable of the drawing-out pole includes an active coated optical fiber and an inactive coated optical fiber, and a worker must cut the inactive coated optical fiber of these and draw it to the user's home. Normally, each of the coated optical fibers housed in a cable is numbered, and information indicating whether a wire is an active coated optical fiber or an inactive coated optical fiber is registered for each coated optical fiber number in the facility management operation system of a communication service provider. However, due to human error or the like, there is a possibility of mismatch between the registered information of coated optical fibers on a system and actual usage situations. For that reason, in the opening construction for a PON-type optical line as described above, it is very important to check at the work site which coated optical fiber is active or inactive among a plurality of coated optical fibers housed in a cable so as not to cut an active coated optical fiber, which is not a target for working upon, by mistake.

Patent Literature 1 to 3, Non Patent Literature 1, and the like have proposed methods for determining whether a coated optical fiber at a downstream portion of an external branch SP in the form of PON is an active coated optical fiber or an inactive coated optical fiber.

CITATION LIST

Patent Literature

Patent Literature 1: JP 2008-309958 A
Patent Literature 2: JP 2009-25052 A
Patent Literature 3: JP 2018-186503 A

Non Patent Literature

Non Patent Literature 1: Keita Matsuoka, Shinichi Niimi, Masaaki Miyamoto, Hiroshi Sugawara "New Optical Fiber Identifier," Proceedings of the 64th International Cable Connectivity Symposium, pp. 704-708, November 2015.

SUMMARY OF THE INVENTION

Technical Problem

Patent Literature 1 and Patent Literature 2 have disclosed methods for determining the presence or absence of a test light blocking filter connected to a coated optical fiber before an ONU. These are methods using a two-wavelength optical time domain reflectometer (OTDR) or two-wavelength optical fiber identifying light, and they have the common principle in which light in a wavelength band that penetrates a test light blocking filter having band reflection characteristics and two-wavelength test light beams in a reflection wavelength band are made incident from a communication building to the coated optical fiber at a downstream portion of an external branch SP, and the magnitudes of the reflectance ratios of the two-wavelength reflected light beams are compared to determine whether the terminal end portion of the target coated optical fiber is a test light blocking filter.

Although these methods are based on the assumption that no test light blocking filters are connected to an inactive coated optical fiber, a test light blocking filter may also be connected to an inactive coated optical fiber in the actual facility management of coated optical fibers at the downstream portion of the external SP. A coated optical fiber at the downstream portion of the external SP connected to the test light blocking filter even when no user is using the optical line is called a retained coated optical fiber, and the purpose for the retained coated optical fiber is to allow a user who has applied for an optical line to be able to open the optical line by connecting an ONU to the retained coated optical fiber by himself or herself. Due to the foregoing, it is difficult to distinguish an active coated optical fiber from an inactive coated optical fiber using the methods of Patent Literature 1 and Patent Literature 2.

Non Patent Literature 1 has disclosed a method for determining whether an ONU is connected to a target coated optical fiber by bending a coated optical fiber at a downstream portion of an external SP and detecting uplink communication light from the ONU as leaked light. In this method, it is possible to confirm that the target coated optical fiber is an active coated optical fiber if the ONU is in a light emitting state, but if power supply to the ONU is disconnected even temporarily, the ONU is not able to emit light, which makes the detection not possible. Thus, because the method disclosed in Non Patent Literature 1 does not enable an ONU with no power supply to be detected, it is difficult to distinguish an active coated optical fiber from an inactive coated optical fiber using the method.

Patent Literature 3 has disclosed a method for detecting an ONU with no power supply, which cannot be addressed in Non Patent Literature 1. In this method, it is possible to determine whether the terminal end portion of a target coated optical fiber is an ONU with no power supply by making two-wavelength test light beams incident to the coated optical fiber using an OTDR, for which uplink light from the ONU is not able to be detected according to the method of Non Patent Literature 1, and using a return loss of two-wavelength reflected light from the terminal end portion of the coated optical fiber in which the reflection characteristics of an optical transceiver of the ONU are reflected. By using the method of Non Patent Literature 1 and the method of Patent Literature 3 in combination, it is possible to determine whether a target coated optical fiber is an active coated optical fiber or an inactive coated optical fiber.

However, the method of Patent Literature 3 requires connecting the OTDR to the coated optical fiber at the downstream portion of the external SP with a connector for measurement, and thus the method can be implemented only in a facility equipped with such a connector. Such a connector is mounted only in a modular-type external SP at the downstream portion of the external SP, and there is no place for a detachable connector in the closure of a drawing-out pole near a user's home.

Due to the foregoing, although an ONU with no power supply can be detected in the combined method of Non Patent Literature 1 and Patent Literature 3, there is a problem that it can only be used at a location of a facility of an external SP at which a connector is mounted and it is difficult to distinguish an active coated optical fiber from an inactive coated optical fiber at a drawing-out pole that is an opening construction site.

Therefore, in order to solve the above problem, an object of the present invention is to provide a determination device and a determination method that enable whether an ONU with no power supply is connected to a terminal end portion of a coated optical fiber at a downstream portion of an external SP from any location at which the coated optical fiber at the downstream portion of the external SP is exposed to be determined.

Means for Solving the Problem

In order to solve the above-described problems, a determination device and a determination method according to the present invention is configured to make test light having a plurality of wavelengths incident to an optical fiber side and make a determination based on a light intensity ratio of each reflected light beam reflected at the terminal end or return losses at the terminal end.

Specifically, a first determination device according to the present invention includes a light input/output unit configured to enable, at any position of an optical fiber including a first end connected to a branch side of an optical branch splitter on a passive optical network (PON), input and output of light to and from a side of a second end of the optical fiber, a measurement unit configured to make test light having a plurality of wavelengths incident to the optical fiber via the light input/output unit and to receive returned light generated by the test light in the optical fiber, and a determination unit configured to acquire a reflectance at the second end of the optical fiber at each of the plurality of wavelengths based on a light intensity of reflected light reflected at the second end of the optical fiber among the returned light received by the measurement unit, and to determine a state of the second end of the optical fiber using ratios of reflectances at the different wavelengths.

In addition, a first determination method according to the present invention includes, at any position of an optical fiber including a first end connected to a branch side of an optical branch splitter on a passive optical network (PON), making test light having a plurality of wavelengths incident to a side of a second end of the optical fiber, receiving returned light generated by the test light in the optical fiber, and acquiring a reflectance at the second end of the optical fiber at each of the plurality of wavelengths based on a light intensity of reflected light reflected at the second end of the optical fiber among the returned light, and determining a state of the second end of the optical fiber using ratios of reflectances at the different wavelengths.

Reflection of the test light varies in amount at each wavelength depending on a situation of the terminal end portion of the coated optical fiber. In other words, if the magnitude of the reflection amount at each wavelength can be known, the situation of the terminal end portion of the coated optical fiber can be estimated. Thus, the present invention can provide the determination device and the determination method by which whether the ONU with no power supply is connected to the terminal end portion of the coated optical fiber at the downstream portion of the external SP can be determined at any location at which the coated optical fiber at the downstream portion of the external SP is exposed.

For example, when the test light have three wavelengths of $\lambda 1$, $\lambda 2$, and $\lambda 3$ in order from a shortest wavelength and the reflectances of $\lambda 1$, $\lambda 2$ and $\lambda 3$ are R1, R2, and R3, respectively, the determination unit determines a state in which a terminal end device is connected to the second end of the optical fiber when R1/R2 among the ratios is greater than a predetermined value A, determines a state in which a band reflection-type filter is disposed at the second end of the optical fiber when R1/R2 among the ratios is less than or equal to the predetermined value A and R3/R1 among the ratios is greater than a predetermined value B, and determines a state in which an optical connector disposed at the second end of the optical fiber is open, or a state in which the second end of the optical fiber is cut when R1/R2 among the ratios is less than or equal to the predetermined value A and R3/R1 among the ratios is less than or equal to the predetermined value B.

In addition, for example, when the test light have two wavelengths of $\lambda 1$ and $\lambda 2$ in order from a shortest wavelength and the reflectances of $\lambda 1$ and $\lambda 2$ are R1 and R2, respectively, the determination unit determines a state in which a terminal end device is connected to the second end of the optical fiber when R1/R2 among the ratios is greater than a predetermined value A, and determines a state in which a band reflection-type filter is disposed at the second end of the optical fiber, a state in which an optical connector disposed at the second end of the optical fiber is open, or a state in which the second end of the optical fiber is cut when R1/R2 among the ratios is less than or equal to the predetermined value A.

Meanwhile, a second determination device according to the present invention includes a light input/output unit configured to enable, at any position of an optical fiber including a first end connected to a branch side of an optical branch splitter on a passive optical network (PON), input and output of light to and from a side of a second end of the optical fiber, a measurement unit configured to make test light having a plurality of wavelengths incident to the optical fiber via the light input/output unit and to receive returned light generated by the test light in the optical fiber, and a determination unit configured to acquire a return loss at the second end of the optical fiber at each of the plurality of wavelengths based on a light intensity of reflected light reflected at the second end of the optical fiber among the returned light received by the measurement unit, and, when the test light have two wavelengths of $\lambda 1$ and $\lambda 2$ in order from a shortest wavelength and the return losses of $\lambda 1$ and $\lambda 2$ are RL1 and RL2, respectively, to determine a state in which the second end of the optical fiber is cut when the return loss RL1 is greater than a predetermined value a, to determine a state in which an optical connector disposed at the second end of the optical fiber is open when the return loss RL1 is less than or equal to the predetermined value a and the return loss RL2 is less than or equal to a predetermined value b, and to determine a state in which a terminal end device is connected to the second end of the optical fiber when the return loss RL1 is less than or equal to the predetermined value a and the return loss RL2 is greater than the predetermined value b.

In addition, a second determination method according to the present invention includes, at any position of an optical fiber including a first end connected to a branch side of an optical branch splitter on a passive optical network (PON), making test light having a plurality of wavelengths incident to a side of a second end of the optical fiber, receiving returned light generated by the test light in the optical fiber, and acquiring a return loss at the second end of the optical fiber at each of the plurality of wavelengths based on a light intensity of reflected light reflected at the second end of the optical fiber among the returned light, and when the test light have two wavelengths of $\lambda 1$ and $\lambda 2$ in order from a shortest wavelength and the return losses of $\lambda 1$ and $\lambda 2$ are RL1 and RL2, respectively, determining a state in which the second end of the optical fiber is cut when the return loss RL1 is greater than a predetermined value a, determining a state in which an optical connector disposed at the second end of the optical fiber is open when the return loss RL1 is less than or equal to the predetermined value a and the return loss RL2 is less than or equal to a predetermined value b, and determining a state in which a terminal end device is connected to the second end of the optical fiber when the return loss RL1 is less than or equal to the predetermined value a and the return loss RL2 is greater than the predetermined value b.

Reflection of the test light varies in return loss at each wavelength depending on a situation of the terminal end portion of the coated optical fiber. Here, if Rayleigh backscattered light can also be measured when measuring a reflection amount, the return loss can be known for each wavelength, and the situation of the terminal end portion of the coated optical fiber can be estimated from the result. Thus, the present invention can provide the determination device and the determination method by which whether the ONU with no power supply is connected to the terminal end portion of the coated optical fiber at the downstream portion of the external SP can be determined at any location at which the coated optical fiber at the downstream portion of the external SP is exposed.

Effects of the Invention

The present invention can provide the determination device and the determination method by which whether the ONU with no power supply is connected to the terminal end portion of the coated optical fiber at the downstream portion of the external SP can be determined at any location at which the coated optical fiber at the downstream portion of the external SP is exposed.

DESCRIPTION OF EMBODIMENTS

Embodiments of the present invention will be described with reference to the accompanying drawings. The embodiments described below are examples of the present invention and the present invention is not limited to the embodiments described below. Note that constituent components with the same reference signs in the present specification and the drawings are assumed to be the same components.

First Embodiment

Figure 1:
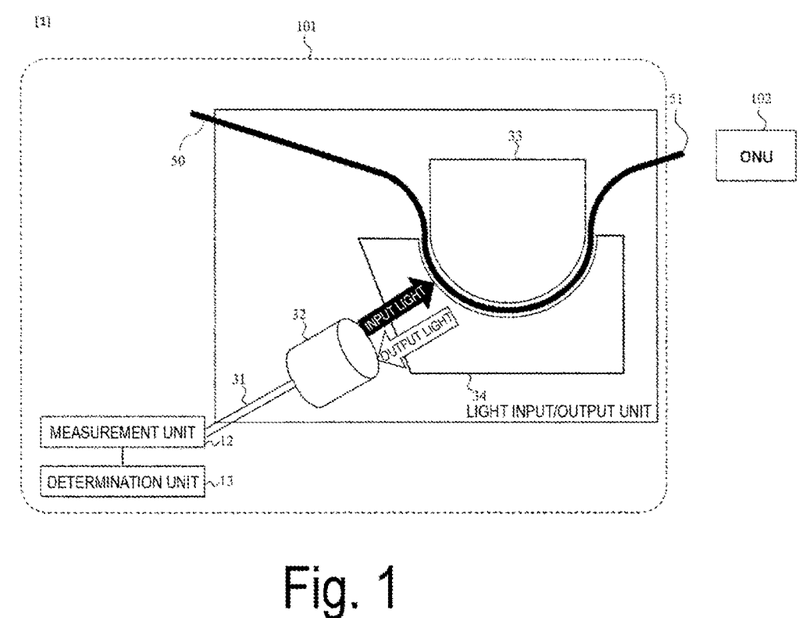
FIG. 1 is a diagram for describing a determination device according to the present invention.

FIG. 1 is a diagram for describing a determination device 101 according to the present embodiment. The determination device 101 determines a terminal end state of a coated optical fiber 50. The determination device 101 includes a light input/output unit 11, a measurement unit 12, and a determination unit 13. Here, the light input/output unit 11 uses the optical fiber 50 including a first end connected to a branch side of a PON optical branch splitter to input and output light at a second end (a terminal end 51) side of the optical fiber 50 at any position on the optical fiber 50.

The measurement unit 12 makes test light having a plurality of wavelengths incident to the optical fiber 50 via the light input/output unit 11, and receives returned light generated from the test light by the optical fiber 50.

The determination unit 13 acquires, from the returned light received by the measurement unit 12, a reflectance at the second end (the terminal end 51) of the optical fiber 50 using a light intensity of light reflected at the second end (the terminal end 51) of the optical fiber 50 for each wavelength and determines the state of the second end (the terminal end 51) of the optical fiber 50 from the reflectance ratio of the different wavelengths.

The light input/output unit 11 outputs light propagating inside the core of the coated optical fiber 50 to the outside as leaked light by applying a predetermined bending shape to the coated optical fiber 50, and further inputs external light into the core. The measurement unit 12 makes test light having a plurality of wavelengths incident to the coated optical fiber 50 and measures a distribution of the reflectances of the coated optical fiber 50 from the returned light. The determination unit 13 analyzes the distribution of the reflectances. The determination device 101 can determine whether an ONU 102 with no power supply is connected to the terminal end 51 of the coated optical fiber at any location at the downstream portion of an external SP at which the coated optical fiber 50 is exposed.

The measurement unit 12 is only required to have a function of emitting test light having three different center wavelengths and receiving a distribution of reflectances in the longitudinal direction of the optical fiber, and to use an OTDR, a coherent detection reception-type OTDR, a photon counting-type OTDR, or an optical frequency domain reflectometer (OFDR). In the present embodiment, a case in which the measurement unit 12 is an OTDR will be described.

Test light output from the OTDR is input into a gradient index (GRIN) lens 32 via a probe optical fiber 31. Here, a generic single mode fiber is used for the probe optical fiber 31, a lens having a beam waist width of 27 μm and a focal length of 1090 μm is used for the GRIN lens 32.

The coated optical fiber 50 is sandwiched between a convex block 33 and a concave block 33 to be formed in a predetermined bent shape. The collected test light output from the GRIN lens 32 penetrates through the concave block 34 and is input to the bent-shaped portion of the coated optical fiber 50. Here, for the convex block 33, a material having a refractive index greater than about 1.5 that is the refractive index of the covering of the coated optical fiber 50 is required to be used in order to reduce reflection of leaked light from the coated optical fiber 50 by the convex block 33. For example, the convex block 33 is formed of glass or polycarbonate having a refractive index of 1.57. The bent shape of the coated optical fiber 50 has a curvature radius of 2 mm and a center angle of 90 degrees in the plane illustrated in FIG. 1.

The test light input to the coated optical fiber 50 penetrates through the coated optical fiber 50 and is reflected at the terminal end 51. Here, because a length of the coated optical fiber 50 is at most 2 km or less, a sample of a coated optical fiber having a length of 200 m is used in the present embodiment.

The reflected light from the terminal end 51 leaks from the location that is the same as the input location of the test light and the location to which the predetermined bent shape of the coated optical fiber 50 has been applied, penetrates through the concave block 34, and then is input to the GRIN lens 32. The reflected light output from the GRIN lens 32 is input to the measurement unit 12 (OTDR) via the probe fiber 31. The OTDR analyzes the input reflected light and obtains a distribution of reflectances of the coated optical fiber 50 in the fiber longitudinal direction.

In the present embodiment, the test light has three wavelengths including $\lambda 1$, $\lambda 2$, and $\lambda 3$ in order from a shortest wavelength and the reflectances of $\lambda 1$, $\lambda 2$, and $\lambda 3$ are R1, R2, and R3, respectively. The following three points are features of the determination unit 13. Here, the determination unit 13 determines that the terminal end device (the ONU 102) is connected to the second end (the terminal end 51) of the optical fiber 50 if R1/R2 among the ratios is greater than a predetermined value A.

The determination unit 13 determines that a band reflection-type filter is disposed at the second end (the terminal end 51) of the optical fiber 50 if R1/R2 among the ratios is less than or equal to the predetermined value A and R3/R1 among the ratios is greater than a predetermined value B. The determination unit 13 determines that an optical connector disposed at the second end (the terminal end 51) of the optical fiber 50 is open or the second end (the terminal end 51) of the optical fiber 50 is cut if R1/R2 among the ratios is less than or equal to the predetermined value A and R3/R1 among the ratios is less than or equal to the predetermined value B.

Here, the three wavelengths of the test light output from the OTDR are set in consideration of the band reflection characteristics of the terminal end 51 of the coated optical fiber 50. An isolator that reflects light in the 1310 nm band to prevent the reflected light of uplink communication light emitted from the ONU 102 from entering a light emitting element of the ONU is built in the light emitting element in the ONU 102 installed at the terminal end 51 when the coated optical fiber 50 is active. Furthermore, the ONU 102 includes a WDM filter that transmits the 1490 nm band to receive downlink communication light from an optical line terminal (OLT) and a photodetector for receiving light.

Thus, when test light having wavelengths of 1310 nm and 1490 nm is made incident from the coated optical fiber 50 to the ONU 102, strong reflected light is generated due to the test light having the wavelength of 1310 nm, but only weak reflected light is generated due to the test light having a wavelength of 1490 nm. In consideration of the band reflection characteristics of the optical devices built in the ONU, 1310 nm and 1490 nm are suitable for the wavelengths $\lambda 1$ and $\lambda 2$ of the test light output from the OTDR, respectively. However, a laser light source in the 1490 nm band is more expensive than a laser light source in the 1550 nm band, which is a typical communication wavelength band. For this reason, a laser light source in the 1550 nm band may be used for the wavelength $\lambda 2$. Hereinafter, the wavelengths $\lambda 1$ and $\lambda 2$ of the test light output from the OTDR will be described as 1310 nm and 1550 nm.

Furthermore, a test light blocking filter installed at the terminal end 51 of the coated optical fiber 50 is considered, and 1650 nm which is the reflection band of the test light blocking filter is set as the wavelength $\lambda 3$ of the test light.

When the test wavelengths described above are selected, a light input and output efficiency of the input/output unit 11 described above with respect to the coated optical fiber 50 is approximately −13 dB in all of the wavelengths.

In addition, a pulse width of the test light output from the OTDR is 10 ns (a spatial resolution of 1 m) because the spatial resolution required in the present measurement is 1 m or less. The length of an optical fiber between the test light blocking filter installed at the user's home and the ONU is a minimum of 1.5 m, and thus the required spatial resolution of the OTDR is set to 1 m or less in order to identify the two adjacent reflection events.

In addition, the measuring range is 2 km, taking the longest length of the coated optical fiber at the downstream portion of the external SP into account. Finally, the average number of measurements is $2^{14}$ (=8192) times per wavelength measurement. This value is the average number of measurements in consideration of the measurement time set to approximately 10 seconds per wavelength and obtaining an improved SN ratio of OTDR waveforms due to the averaging effect while minimizing the measurement waiting time in the construction work.

Figure 2:
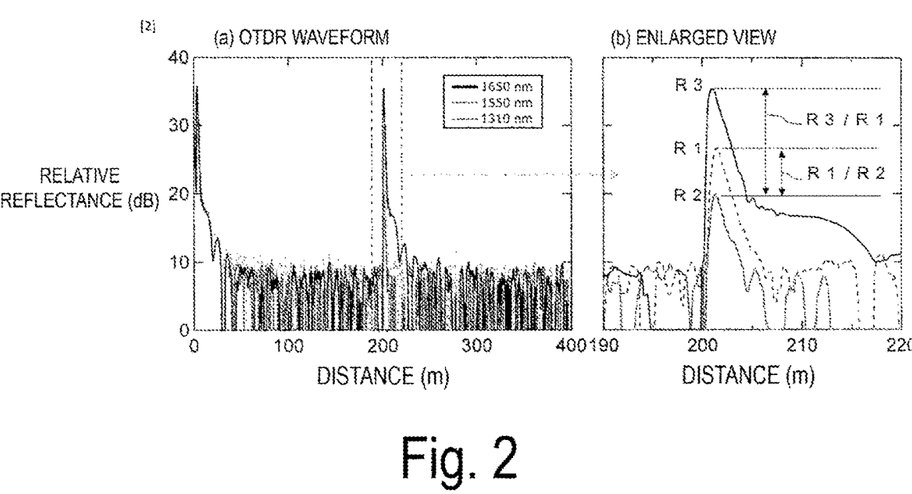
FIG. 2 is a diagram for explaining OTDR waveforms (of three wavelengths) acquired by the determination device according to the present invention. (a) shows overall wavelengths, and (b) is an enlarged view near the distance 200 m.

FIG. 2(a) shows OTDR waveforms obtained from the measurement of the test light having the three wavelengths. Further, the "distance" for the horizontal axis is a distance in the direction from a location of the coated optical fiber 50 at which the input/output unit 11 is disposed toward the terminal end 51 and a distance in the direction from the terminal end 51 toward the input/output unit 11. Further, the distance from the location where the input/output unit 11 is installed to the terminal end 51 is approximately 200 m. Typically, Rayleigh backscattered light from the optical fiber and reflected light at the terminal end of the optical fiber are displayed in the OTDR waveforms. In the present embodiment, a total loss of approximately −26 dB is generated in the light input and the light output of the input/output unit 11. In addition, the dynamic range of the OTDR is approximately 20 dB, and thus the Rayleigh backscattered light is not observed because it has a signal strength that is less than or equal to the noise floor of the OTDR. Although a return loss is used as a common evaluation parameter for a reflection event in an optical fiber, Rayleigh backscattered light needs to be observed to measure a return loss. Thus, in a case in which the measurement unit 12 of the determination device 101 is an OTDR, the measurement unit 12 is unable to measure the return loss of the terminal end 51 of the optical fiber 50.

Therefore, in a case where the measurement unit 12 is an OTDR, a method for evaluating and identifying a reflection event at the terminal end 51 of the coated optical fiber 50 using the reflectance instead of the amount of return loss will be described below.

FIG. 2(b) is an enlarged view of the OTDR waveforms at the terminal end 51 of the coated optical fiber 50 at the point in a distance of 200 m. The waveforms illustrated in this drawing are waveforms of a case in which the ONU 102 with no power supply is connected to the terminal end 51 and a test light blocking filter is disposed before the terminal end 51. The reflectances at the wavelengths 1310, 1550, and 1650 nm of the test light are set to R1, R2, and R3. Because the ONU 102 include a WDM filter, a difference is made between R1 and R2 as shown in the drawing. In addition, because a 1650 nm band test light blocking filter is installed at the front of the ONU 102, there is also a difference between R3 and R1. Because R1/R2 and R3/R1 that are the reflectance ratios of the wavelengths have unique values due to the terminal end 51, the determination unit 13 can determine a state of the terminal end 51 of the coated optical fiber 50 using the two parameters. Details will be described below using a flowchart for determination.

Figure 3:
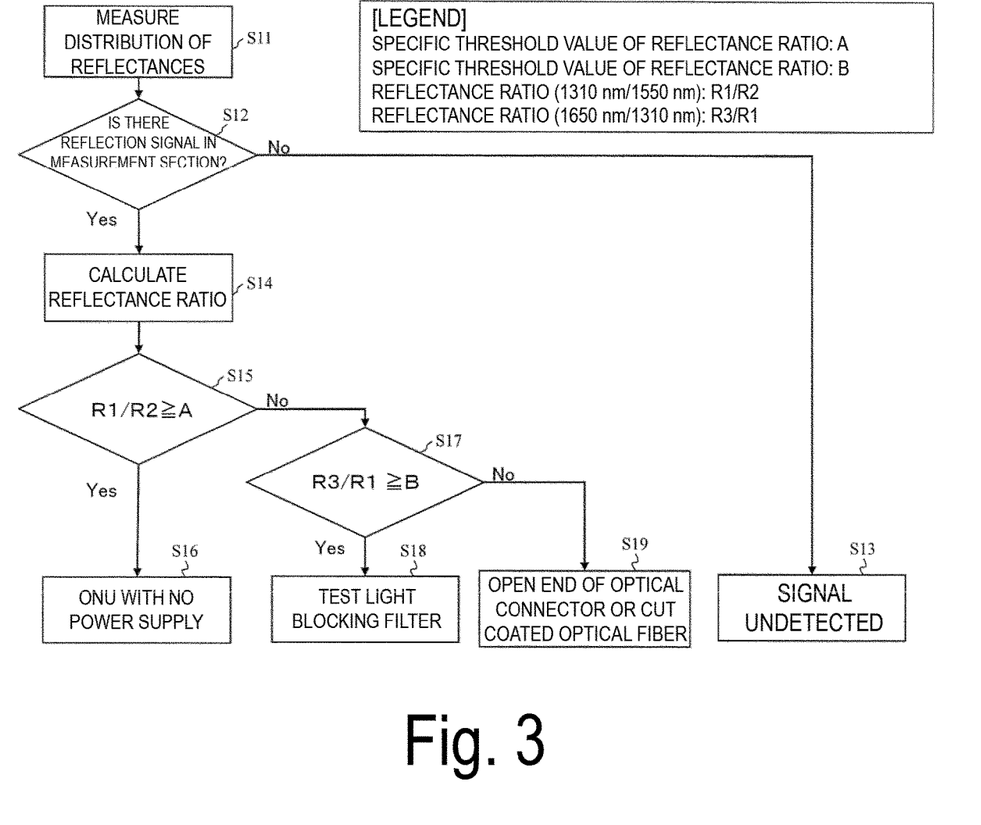
FIG. 3 is a flowchart explaining a determination method according to the present invention.

FIG. 3 is a flowchart for determination of a state of the terminal end 51 performed by the determination unit 13 using the reflectance ratios at each wavelength (R1/R2 and R3/R1) from the terminal end 51. First, the distribution of the reflectances is measured according to the method described above (step S11). Next, it is determined if there is a reflection event of an OTDR waveform (step S12). In this determination, a reflection signal is determined to be present when a noise floor at a distance or interval at which no optical fiber is present is measured and a signal of a higher level than a threshold value of the noise floor is observed ("Yes" in step S12). On the other hand, if a reflection signal at a higher level than the threshold value of the noise floor is not detected ("No" in step S12), the state of the terminal end 51 of the coated optical fiber is unknown as an undetected signal (step S13).

If the reflection signal is detected, the reflectance ratios (R1/R2 and R3/R1) are calculated (step S14). Then, the determination unit 13 determines whether the state of the terminal end 51 of the coated optical fiber 50 is the ONU with no power supply based on whether R1/R2 is equal to or greater than or less than the predetermined threshold value A (step S15). If R1/R2 is equal to or greater than the predetermined threshold value A ("Yes" in step S15), the state of the terminal end 51 of the coated optical fiber 50 is the ONU with no power supply (step S16).

If R1/R2 is less than the threshold value A ("No" in step S15), the determination unit 13 determines whether the state of the terminal end 51 of the coated optical fiber 50 is a test light blocking filter based on whether R3/R1 is equal to or greater than or less than the predetermined threshold value B (step S17). If the R3/R1 is equal to or greater than the predetermined threshold value B ("Yes" in step S17), the state of the terminal end 51 of the coated optical fiber 50 is determined to be a test light blocking filter (step S18). If the R3/R1 is less than the threshold value B ("No" in step S17), the determination unit 13 determines that the state of the terminal end 51 of the coated optical fiber 50 is a state other than the ONU with no power supply and the test light blocking filter that is a state in which the open end of the optical connector or the coated optical fiber is cut (step S19).

Figure 4:
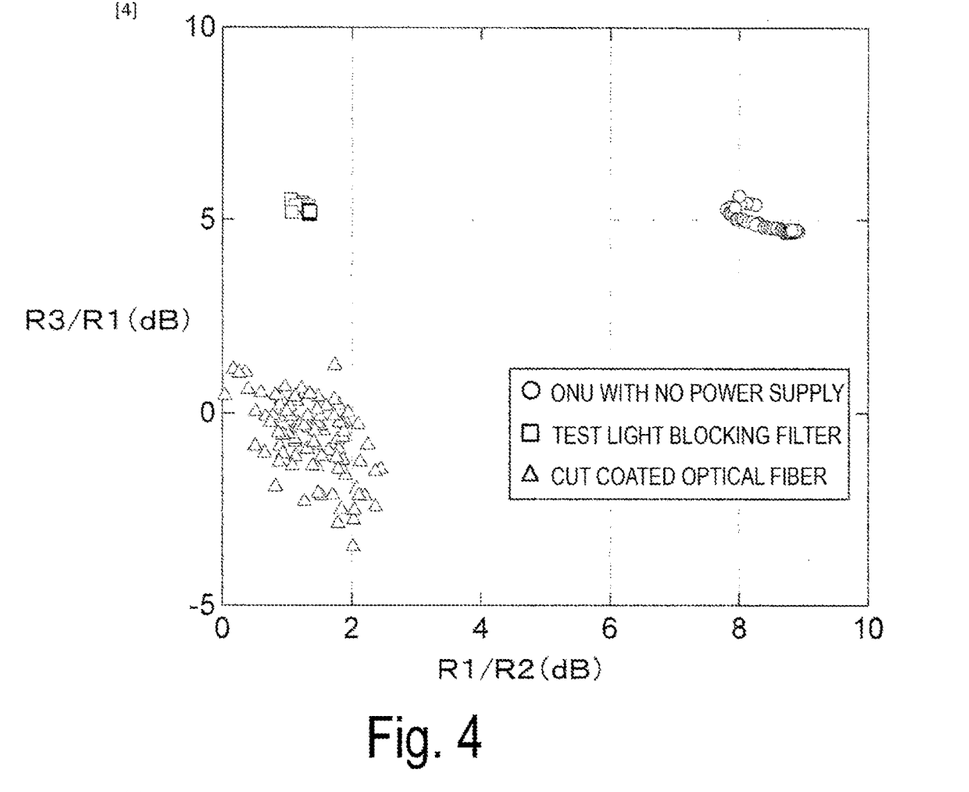
FIG. 4 is a diagram explaining ratios of reflectance (three wavelengths) acquired by the determination device according to the present invention.

FIG. 4 shows the results of the calculation of the reflectance ratios in the three states of the terminal end 51 of the coated optical fiber 50 (see below) and plotting R1/R2 on the horizontal axis of the graph and R3/R1 on the vertical axis. The drawing shows the results of a total of 3000 measurement operations. 1000 measurement operations are performed in each of a state in which the terminal end 51 of the coated optical fiber 50 is connected to the ONU with no power supply, a state in which the test light blocking filter is disposed at the terminal end 51, and a state in which the terminal end 51 of the coated optical fiber is cut. Here, it is seen that, when the determination threshold values A and B are set to 4 in the flowchart of FIG. 3, the ONU with no power supply, the test light blocking filter, and the cutting of the coated optical fiber can be correctly determined.

As described above, in a configuration in which the input/output unit 11 and the measurement unit 12 that is an OTDR are connected, the determination unit 13 can determine the state of the terminal end 51 of the coated optical fiber 50 (the ONU with no power supply, the test light blocking filter, or an open end of the optical connector or the cutting of the coated optical fiber) by using the reflectance ratios R1/R2 and R3/R1 of reflected light from the terminal end 51 of the coated optical fiber at the measured three wavelengths.

Second Embodiment

FIG. 1 also shows a configuration of the present embodiment. In the present embodiment, if it is assumed that the test light has two wavelengths of $\lambda 1$ and $\lambda 2$ in order from a shortest wavelength, and the reflectances of $\lambda 1$ and $\lambda 2$ are R1 and R2, respectively, the determination unit 13 makes the following determination.

Here, the determination unit 13 determines that the terminal end device (the ONU 102) is connected to the second end (the terminal end 51) of the optical fiber 50 if R1/R2 among the ratios is greater than a predetermined value A.

Further, if R1/R2 among the ratios is less than or equal to the predetermined value A, the determination unit 13 determines a state in which a band reflection-type filter is disposed at the second end (the terminal end 51) of the optical fiber 50, a state of the optical connector disposed at the second end (the terminal end 51) of the optical fiber 50 being in an open state, or a state of the second end (the terminal end 51) of the optical fiber 50 being cut.

The determination device 101 of the present embodiment determines the test light output from the OTDR of the measurement unit 12 to have two wavelengths of 1310 nm and 1550 nm. This two-wavelength measurement method is possible at a low cost because test light of 1650 nm is not used. However, in the measurement of the two wavelengths, the terminal end determination process is performed only with the reflectance ratio R1/R2. Because the range of R1/R2 in which the test light blocking filter is disposed at the terminal end 51 of the coated optical fiber overlaps the range in which the terminal end 51 is the open end of the optical connector or the coated optical fiber is cut. Thus, it is not possible to perform terminal end determination for the test light blocking filter and the open end of the optical connector, or the cutting of the coated optical fiber.

Figure 5:
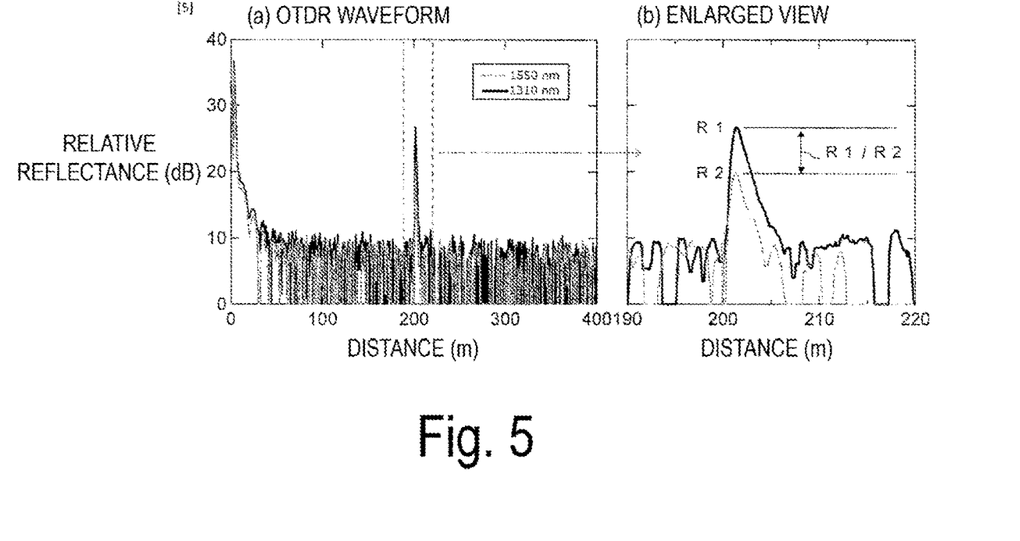
FIG. 5 is a diagram explaining OTDR waveforms (of two wavelengths) acquired by the determination device according to the present invention. (a) shows overall wavelengths, and (b) is an enlarged view near the distance 200 m.

FIG. 5(a) shows OTDR waveforms obtained from the measurement of the test light having the two wavelengths. FIG. 5(b) is an enlarged view of the OTDR waveforms at the terminal end 51 of the coated optical fiber 50 at the point in a distance of 200 m. The waveforms illustrated in this drawing are waveforms of a case in which the ONU 102 with no power supply is connected to the terminal end 51 and a test light blocking filter is disposed before the terminal end 51. The reflectances at the wavelengths 1310 and 1550 nm of the test light are set to R1 and R2. Because the ONU 102 include a WDM filter, a difference is made between R1 and R2 as shown in the drawing. Because R1/R2 that is the reflectance ratio of the wavelengths has unique values due to the terminal end 51, the determination unit 13 can determine a state of the terminal end 51 of the coated optical fiber 50 using the one parameter. Details will be described below using a flowchart for determination.

Figure 6:
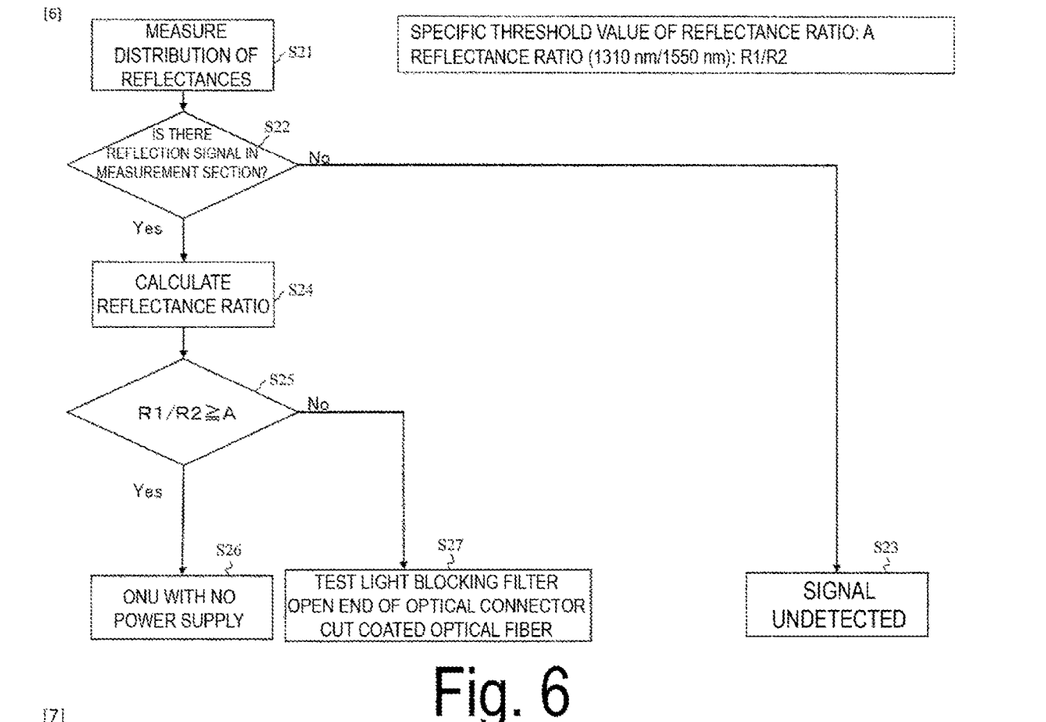
FIG. 6 is a flowchart explaining a determination method according to the present invention.

FIG. 6 is a flowchart for determination of a state of the terminal end 51 performed by the determination unit 13 using the reflectance ratio R1/R2 at each wavelength from the terminal end 51. First, the distribution of the reflectances is measured according to the method described above (step S21). Next, it is determined if there is a reflection event of an OTDR waveform (step S22). In this determination, a reflection signal is determined to be present when a noise floor at a distance or interval at which no optical fiber is present is measured and a signal of a higher level than a threshold value of the noise floor is observed ("Yes" in step S22). On the other hand, if a reflection signal at a higher level than the threshold value of the noise floor is not detected ("No" in step S22), the state of the terminal end 51 of the coated optical fiber is unknown as an undetected signal (step S23).

If the reflection signal is detected, the reflectance ratio R1/R2 is calculated (step S24). Then, the determination unit 13 determines whether the state of the terminal end 51 of the coated optical fiber 50 is the ONU with no power supply based on whether R1/R2 is equal to or greater than or less than the predetermined threshold value A (step S25). If R1/R2 is equal to or greater than the predetermined threshold value A ("Yes" in step S25), the state of the terminal end 51 of the coated optical fiber 50 is the ONU with no power supply (step S26). On the other hand, if the R1/R2 is less than the threshold value A ("No" in step S25), the determination unit determines that the state of the terminal end 51 of the coated optical fiber 50 is a state of the test light blocking filter, the open end of the optical connector, or the coated optical fiber being cut (step S27).

Figure 7:
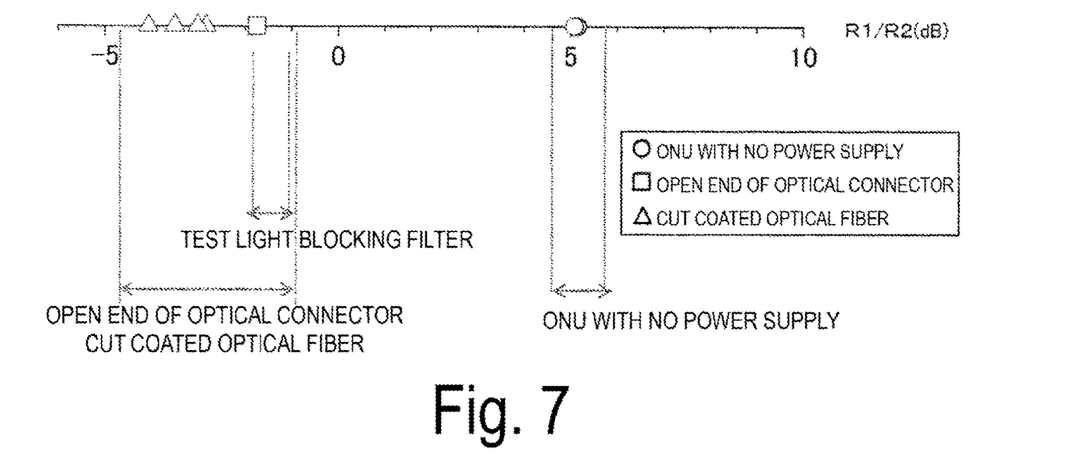
FIG. 7 is a diagram explaining ratios of reflectance (two wavelengths) acquired by the determination device according to the present invention.

FIG. 7 shows the results of the calculation of the reflectance ratio in the three states of the terminal end 51 of the coated optical fiber 50 (see below) and the plotting of R1/R2 on the axis. The drawing shows the results of a total of 900 measurement operations. 300 measurement operations are performed in each of a state in which the terminal end 51 of the coated optical fiber 50 is connected to the ONU with no power supply, a state in which the test light blocking filter is disposed at the terminal end 51, and a state in which the terminal end 51 of the coated optical fiber is cut. Here, it is seen that, when the determination threshold values A is set to 4 in the flowchart of FIG. 5, the ONU with no power supply, the test light blocking filter, or the cutting of the coated optical fiber can be correctly determined.

As described above, in a configuration in which the input/output unit 11 and the measurement unit 12 that is an OTDR are connected, the determination unit 13 can determine the state of the terminal end 51 of the coated optical fiber 50 (the ONU with no power supply, the test light blocking filter, the open end of the optical connector, or the cutting of the coated optical fiber) by using the reflectance ratio R1/R2 of reflected light from the terminal end 51 of the coated optical fiber at the measured two wavelengths as a determination parameter.

Third Embodiment

FIG. 1 also shows a configuration of the present embodiment. The determination device 101 of the present embodiment includes the light input/output unit 11, the measurement unit 12, and the determination unit 13.

Here, the light input/output unit 11 uses the optical fiber 50 including a first end connected to a branch side of a PON optical branch splitter to input and output light at the second end (a terminal end 51) side of the optical fiber 50 at any position on the optical fiber 50. Here, the measurement unit 12 made test light having a plurality of wavelengths incident to the optical fiber 50 via the light input/output unit 11, and receives returned light generated from the test light by the optical fiber 50.

The determination unit 13 acquires, from the returned light received by the measurement unit 12, a return loss at the second end (the terminal end 51) of the optical fiber 50 using a light intensity of light reflected at the second end of the optical fiber 50. In a case in which the test light has two wavelengths of $\lambda 1$ and $\lambda 2$ in order from a shortest wavelength and the return losses are set to RL1 and RL2, respectively, if the return loss RL1 is greater than a predetermined value a, the determination unit 13 determines the second end of the optical fiber 50 is cut.

Further, the determination unit 13 determines that the optical connector disposed at the second end of the optical fiber 50 is in an open state if the return loss RL1 less than or equal to the predetermined value a and the return loss RL2 is less than or equal to a predetermined value b. In addition, the determination unit 13 determines that the terminal end device (the ONU 102) is connected to the second end (the terminal end 51) of the optical fiber 50 if the return loss RL1 less than or equal to the predetermined value a and the return loss RL2 is greater than the predetermined value b.

The measurement unit 12 according to the present embodiment is an OFDR, a coherent OTDR, or a photon counting-type OTDR that is more sensitive than the OTDR described in the first and second embodiments. The determination device 101 of the present embodiment can determine a state of the terminal end 51 of the coated optical fiber 50 (the ONU, a band reflection-type filter, or cutting of the coated optical fiber) by simply measuring the waveform of the test light having the two wavelengths 1310 nm and 1550 nm without using three wavelengths by the measurement unit 12. This is because, by using a reflectance distribution measuring instrument that is highly sensitive to the measurement unit 12, Rayleigh backscattered light from the coated optical fiber 50 can be observed regardless of loss at the input/output unit 11, and a return loss in a reflection event at the terminal end 51 is obtained by measuring each wavelength.

Figure 8:
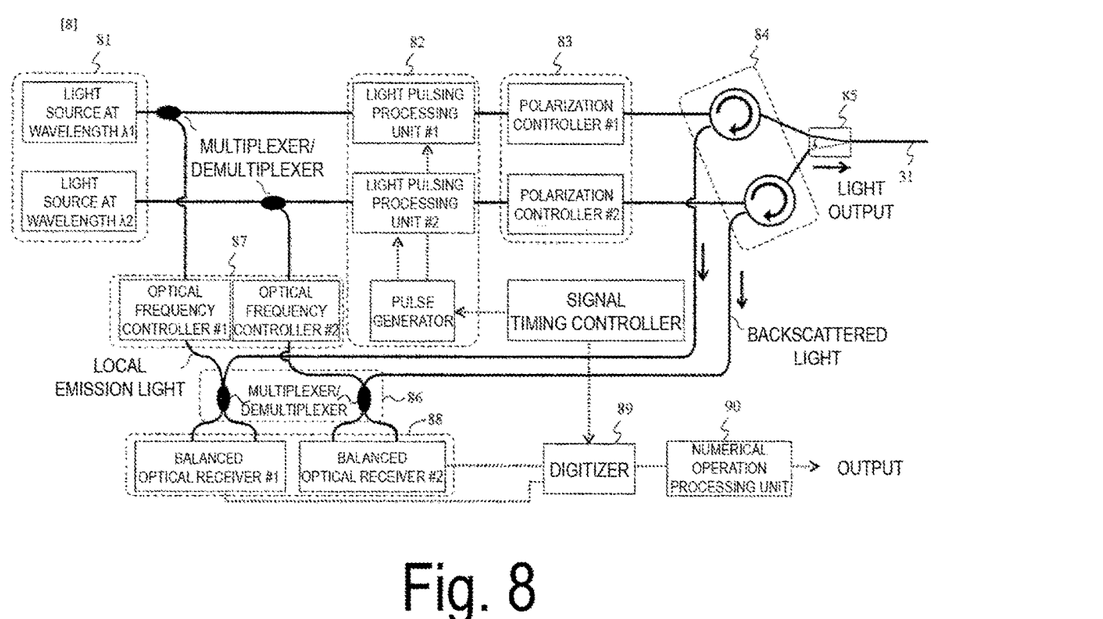
FIG. 8 is a diagram explaining a two-wavelength coherent OTDR included in the determination device according to the present invention.

FIG. 8 is a diagram for describing a configuration of a coherent OTDR of the measurement unit 12. The coherent OTDR uses laser light sources 81 having a narrow line width for coherent detection. Examples of the laser light sources 81 having a narrow line width include a fiber laser having a performance in a line width of 100 kHz or less, an external resonance-type laser, and the like. Here, the wavelengths $\lambda 1$ and $\lambda 2$ are 1310 and 1550 nm, respectively.

Continuous light output from the light sources having the center wavelengths of $\lambda 1$ and $\lambda 2$, respectively, is modulated by a light pulsing circuit 82 to a light pulse of a predetermined time width. The light pulsing circuit 82 is only required to be an optical device that generates a light pulse with a time width of 10 ns corresponding to a spatial resolution of 1 m at an extinction ratio of 50 dB and amplifies a light intensity. The light pulsing circuit 82 includes, for example, a semiconductor optical amplifier.

The light pulses output from the light pulsing circuit 82 are input to a circulator 84 with the polarization state of the light scrambled by the polarization controller 83. A polarization controller or a polarization scrambler may be used for the polarization controller 83. The light pulses of the wavelengths $\lambda 1$ and $\lambda 2$ output from the circulator 84 are measured in a switching manner by an optical path switch 85 for each of the wavelengths.

The optical path switch 85 needs not be a high-speed switch, and a mechanical switch such as a light channel selector, an MEMS switch, or the like may be used. The light pulse output from the optical path switch 85 is input to a probe fiber 31 and is incident on the terminal end 51 of the coated optical fiber 50 as described in FIG. 1.

Reflected light from the terminal end 51 of the coated optical fiber 50 output from the probe fiber 31 is input to a multiplexer/demultiplexer 86 through the optical path switch 85 and the circulator 84. The multiplexer/demultiplexer 86 multiplexes the reflected light and local emission light having the wavelengths $\lambda 1$ and $\lambda 2$ from the light source 81 that has been frequency shifted by an optical frequency control circuit 87 and the light is heterodyne-detected by a balanced optical receiving circuit 88. Here, the light frequency control circuit 87 is only required to be an optical device having a function of shifting the frequency of light by the signal band of the light pulse, and may use an acoustic optical modulator having a frequency shift amount corresponding to the signal band of 100 MHz with a pulse width of 10 ns.

The output beat signal from the balanced optical receiving circuit 88 is sampled in a digitizer 89, and unnecessary frequency components other than those in the signal band of 100 MHz are cut by digital filtering in a numerical operation processing unit 90. Then, the numerical operation processing unit 90 performs a squared averaging process on the repeated measurements of the signal from which unnecessary frequency components have been removed, thereby obtaining an OTDR waveform.

Figure 9:
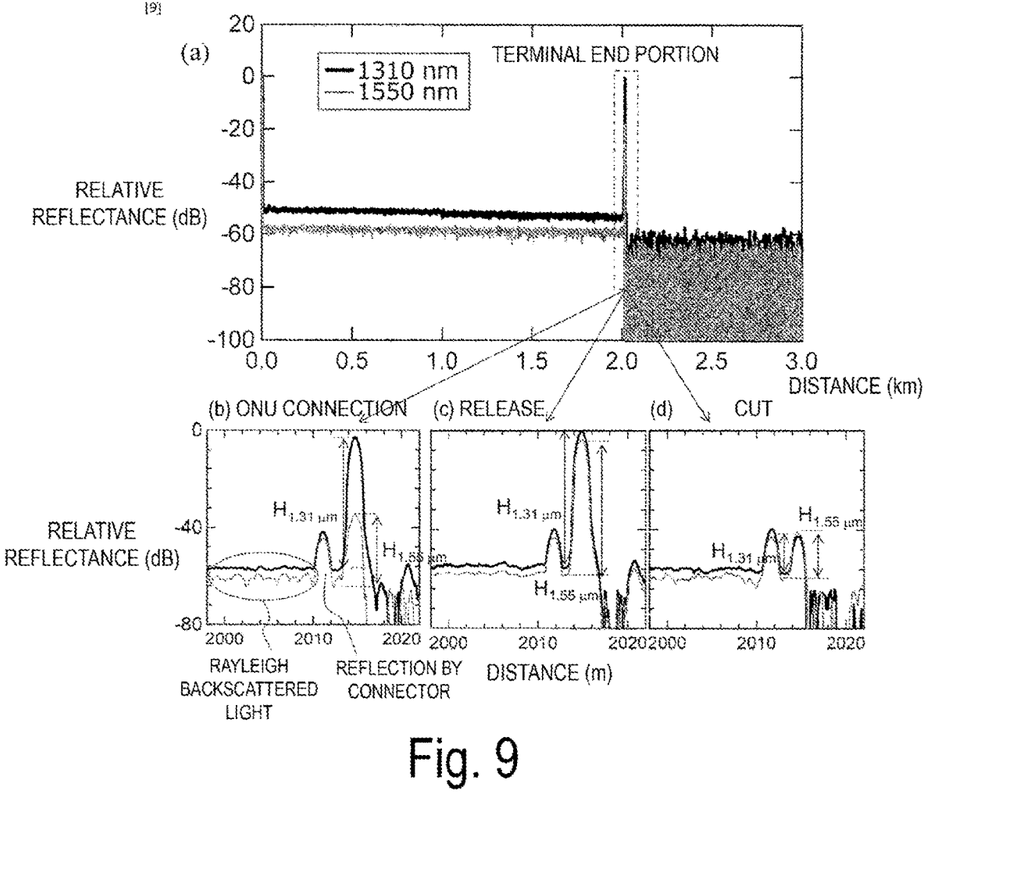
FIG. 9 is a diagram explaining OTDR waveforms acquired by the determination device according to the present invention. (a) shows overall wavelengths, and (b) to (d) are enlarged views near the distance 2010 m.

FIG. 9(a) shows OTDR waveforms with the wavelengths of 1310 and 1550 nm when a coherent OTDR is used as the measurement unit 12. Here, a fiber having a maximum distance of 2 km is used for the optical fiber to be measured. FIGS. 9(b), 9(c), and 9(d) show the OTDR waveforms when a state of the terminal end 51 of the coated optical fiber 50 is the ONU with no power supply, an open end of the connector, and the cut fiber. In all of the cases, reflection by an adjacent connector and reflection at the terminal end 51 can be observed, and Rayleigh backscattered light can also be observed.

Using the following equation, the return loss RL of the terminal end 51 can be calculated.

$$RL = -\alpha + 10\log(10H/10 - 1)(dB) \qquad \text{Equation (1)}$$

Where σ is a Rayleigh backscattered light coefficient dependent on a wavelength and a pulse width, and H is the height from a Rayleigh backscattered light level to the peak level of reflected light (see FIGS. 9(b) to 9(d)). For example, if the coated optical fiber 50 is a single mode fiber, a is −70 and −73 dB at each of the wavelengths of 1310 and 1550 nm.

Figure 10:
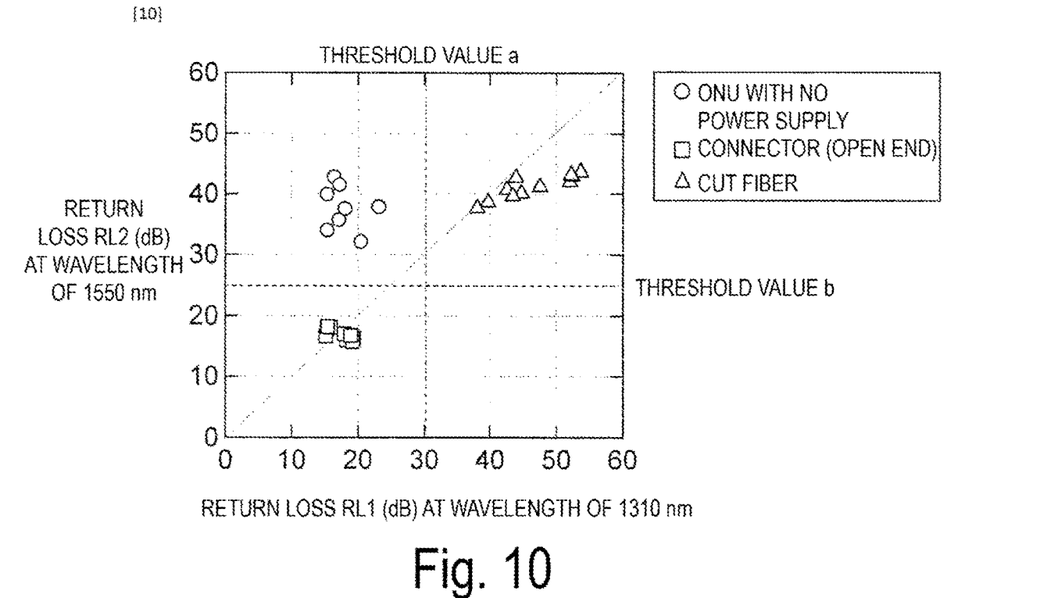
FIG. 10 is a diagram explaining a return loss acquired by the determination device according to the present invention.

FIG. 10 is a map of return loss of the terminal end 51 of the coated optical fiber 50 calculated using Equation (1). The horizontal axis represents the return loss at the wavelength of 1310 nm and the vertical axis represents the return loss at the wavelength of 1550 nm. As shown in FIG. 10, the ranges of the plotted return loss are divided according to the states of the terminal end 51 (the ONU with no power supply, the open end of the connector, and the cut fiber). Thus, by setting a simple threshold value, the state of the terminal end 51 can be determined from the return loss.

Figure 11:
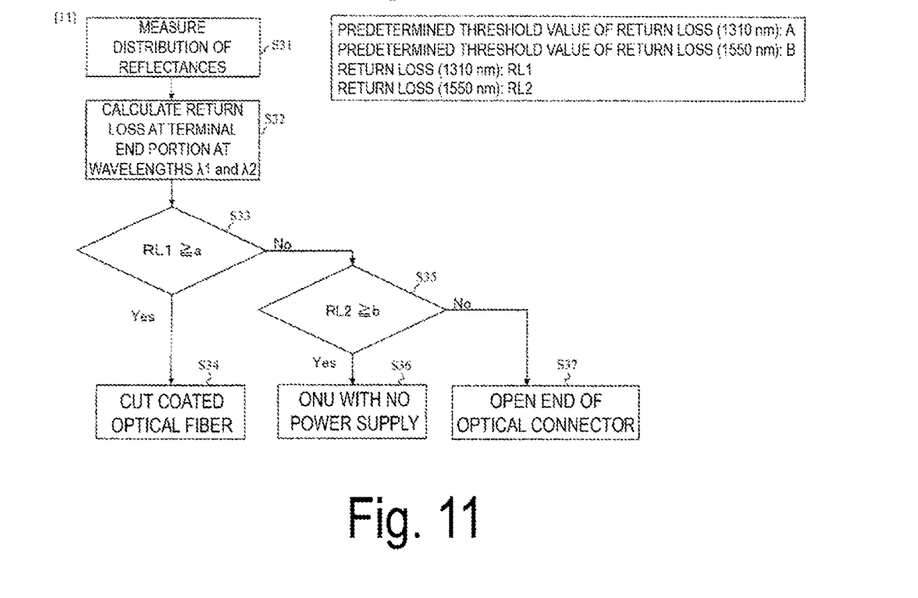
FIG. 11 is a flowchart explaining the determination method according to the present invention.

FIG. 11 is a flowchart for determination of a state of the terminal end 51 using the return losses RL1 and RL2 performed by the determination unit 13. Where, RL1 and RL2 are return losses of test light having wavelengths of $\lambda 1$ (1310 nm) and $\lambda 2$ (1550 nm). First, the distribution of the reflectances is measured according to the method described above (step S31). Next, the return loss is calculated (step S32).

Predetermined threshold values for the return losses RL1 and RL2 are set as a and b respectively. For example, the threshold value a is equal to 30 dB and the threshold value b is equal to 25 dB. Whether the return loss RL1 is less than or equal to or less than the threshold value a (step S33). If the return loss RL1 is equal to or greater than the threshold value a ("Yes" in step S33), the terminal end 51 is determined to be in a state in which the coated optical fiber is cut (step S34). On the other hand, if the return loss RL1 is less than the threshold value a ("No" in step S33), it is determined if the return loss RL2 is less than or equal to or greater than the threshold value b (step S35). If the return loss RL2 is equal to or greater than the threshold value b ("Yes" in step S35), it is determined that the ONU with no power supply is connected to the terminal end 51 (step S36). If the return loss RL2 is less than the threshold value b ("No" in step S35), the state of the terminal end 51 is determined to be an opened connector.

Effects of the Invention

According to the present invention, it is possible to determine whether the ONU with no power supply is connected to the terminal end 51 of the coated optical fiber at the downstream portion of the external SP at any location at which the coated optical fiber at the downstream portion of the external SP is exposed.

REFERENCE SIGNS LIST

11 Light input/output unit
12 Measurement unit
13 Determination unit
31 Probe fiber
32 GRIN lens
33 Convex block
34 Concave block
50 Coated optical fiber
51 Terminal end
81 Laser light source
82 Light pulsing circuit
83 Polarization controller
84 Circulator
85 Optical path switch
86 Multiplexer/demultiplexer
87 Light frequency control circuit
88 Balanced optical receiving circuit
89 Digitizer
90 Numerical operation processing unit
101 Determination device
102 ONU

The invention claimed is:

1. A determination device comprising:
a light input/output unit configured to enable, at any position of an optical fiber including a first end connected to a branch side of an optical branch splitter on a passive optical network (PON), input and output of light to and from a side of a second end of the optical fiber;
a measurement unit configured to make test light having a plurality of wavelengths incident to the optical fiber via the light input/output unit and to receive returned light generated by the test light in the optical fiber; and
a determination unit configured to acquire a reflectance at the second end of the optical fiber at each of the plurality of wavelengths based on a light intensity of reflected light reflected at the second end of the optical fiber among the returned light received by the measurement unit, and to determine a state of the second end of the optical fiber using ratios of reflectances at the different wavelengths.

2. The determination device according to claim 1, wherein, when the test light have three wavelengths of $\lambda 1$, $\lambda 2$, and $\lambda 3$ in order from a shortest wavelength and the reflectances of $\lambda 1$, $\lambda 2$ and $\lambda 3$ are R1, R2, and R3, respectively, the determination unit determines a state in which a terminal end device is connected to the second end of the optical fiber when R1/R2 among the ratios is greater than a predetermined value A, determines a state in which a band reflection-type filter is disposed at the second end of the optical fiber when R1/R2 among the ratios is less than or equal to the predetermined value A and R3/R1 among the ratios is greater than a predetermined value B, and determines a state in which an optical connector disposed at the second end of the optical fiber is open, or a state in which the second end of the optical fiber is cut when R1/R2 among the ratios is less than or equal to the predetermined value A and R3/R1 among the ratios is less than or equal to the predetermined value B.

3. The determination device according to claim 1, wherein, when the test light have two wavelengths of $\lambda 1$ and $\lambda 2$ in order from a shortest wavelength and the reflectances of $\lambda 1$ and $\lambda 2$ are R1 and R2, respectively, the determination unit determines a state in which a terminal end device is connected to the second end of the optical fiber when R1/R2 among the ratios is greater than a predetermined value A, and determines a state in which a band reflection-type filter is disposed at the second end of the optical fiber, a state in which an optical connector disposed at the second end of the optical fiber is open, or a state in which the second end of the optical fiber is cut when R1/R2 among the ratios is less than or equal to the predetermined value A.

4. A determination device comprising:
a light input/output unit configured to enable, at any position of an optical fiber including a first end connected to a branch side of an optical branch splitter on a passive optical network (PON), input and output of light to and from a side of a second end of the optical fiber;
a measurement unit configured to make test light having a plurality of wavelengths incident to the optical fiber via the light input/output unit and to receive returned light generated by the test light in the optical fiber; and
a determination unit configured to acquire a return loss at the second end of the optical fiber at each of the plurality of wavelengths based on a light intensity of reflected light reflected at the second end of the optical fiber among the returned light received by the measurement unit, and, when the test light have two wavelengths of $\lambda 1$ and $\lambda 2$ in order from a shortest wavelength and the return losses of $\lambda 1$ and $\lambda 2$ are RL1 and RL2, respectively, to determine a state in which the second end of the optical fiber is cut when the return loss RL1 is greater than a predetermined value a, to determine a state in which an optical connector disposed at the second end of the optical fiber is open when the return loss RL1 is less than or equal to the predetermined value a and the return loss RL2 is less than or equal to a predetermined value b, and to determine a state in which a terminal end device is connected to the second end of the optical fiber when the return loss RL1 is less than or equal to the predetermined value a and the return loss RL2 is greater than the predetermined value b.

5. A determination method comprising:
at any position of an optical fiber including a first end connected to a branch side of an optical branch splitter on a passive optical network (PON), making test light having a plurality of wavelengths incident to a side of a second end of the optical fiber;
receiving returned light generated by the test light in the optical fiber; and
acquiring a reflectance at the second end of the optical fiber at each of the plurality of wavelengths based on a light intensity of reflected light reflected at the second end of the optical fiber among the returned light, and determining a state of the second end of the optical fiber using ratios of reflectances at the different wavelengths.

6. The determination method according to claim 5, wherein when the test light have three wavelengths of $\lambda 1$, $\lambda 2$, and $\lambda 3$ in order from a shortest wavelength and the reflectances of $\lambda 1$, $\lambda 2$ and $\lambda 3$ are R1, R2, and R3, respectively, a state in which a terminal end device is connected to the second end of the optical fiber is determined when R1/R2 among the ratios is greater than a predetermined value A, a state in which a band reflection-type filter is disposed at the second end of the optical fiber is determined when R1/R2 among the ratios is less than or equal to the predetermined value A and R3/R1 among the ratios is greater than a predetermined value B, and a state in which an optical connector disposed at the second end of the optical fiber is open, or a state in which the second end of the optical fiber is cut is determined when R1/R2 among the ratios is less than or equal to the predetermined value A and R3/R1 among the ratios is less than or equal to the predetermined value B.

7. The determination method according to claim 5, wherein when the test light have two wavelengths of $\lambda 1$ and 2 in order from a shortest wavelength and the reflectances of $\lambda 1$ and $\lambda 2$ are R1 and R2, respectively, a state in which a terminal end device is connected to the second end of the optical fiber is determined when R1/R2 among the ratios is greater than a predetermined value A, and a state in which a band reflection-type filter is disposed at the second end of the optical fiber, a state in which an optical connector disposed at the second end of the optical fiber is open, or a state in which the second end of the optical fiber is cut is determined when R1/R2 among the ratios is less than or equal to the predetermined value A.

* * * * *